Nov. 20, 1956  L. WOLIN ET AL  2,771,243
APPARATUS FOR SIMULATING AN ENGINE
Filed Sept. 3, 1952  3 Sheets-Sheet 2

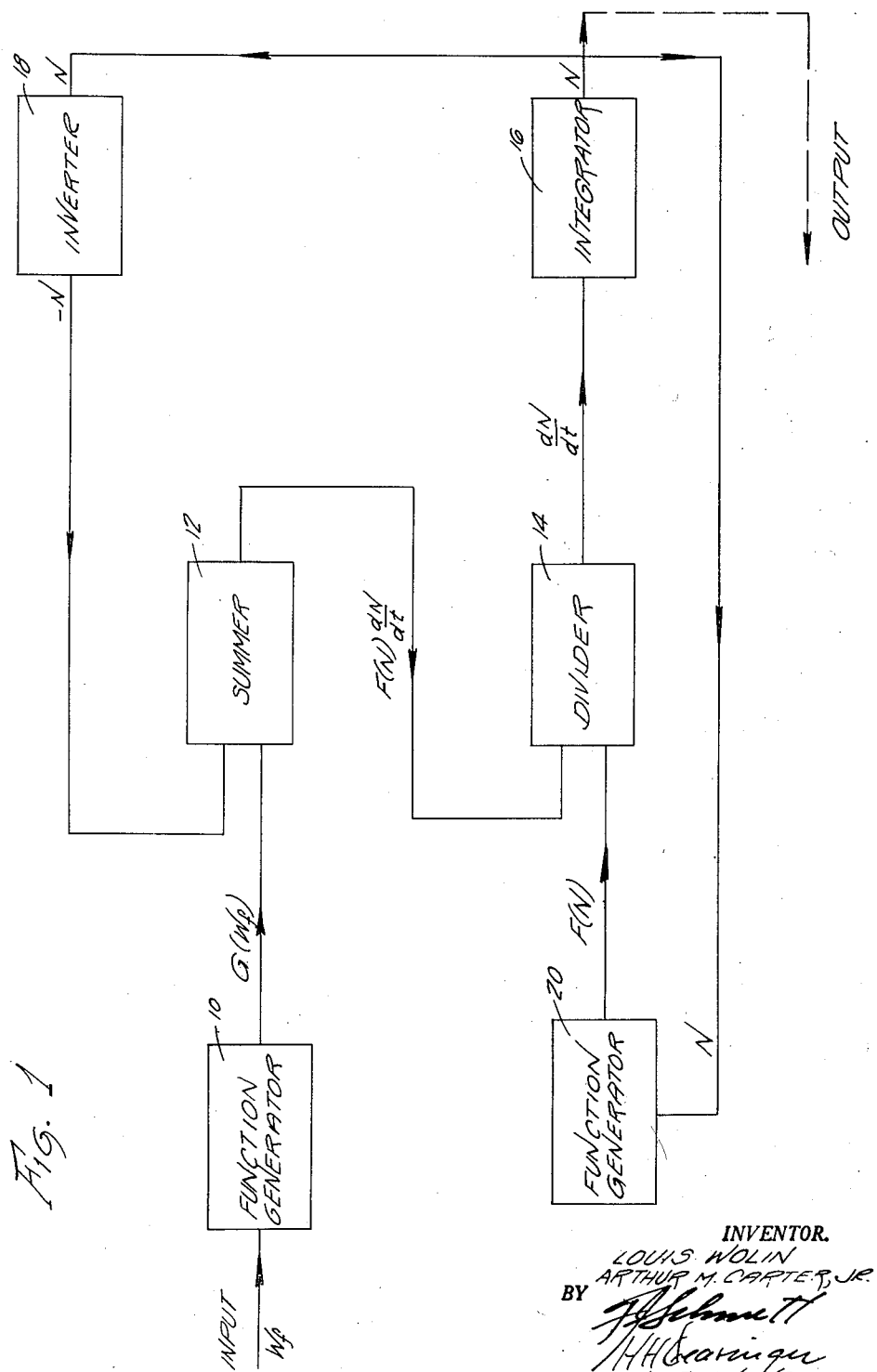

INVENTOR.
LOUIS WOLIN
ARTHUR M. CARTER, JR.
BY
ATTORNEYS

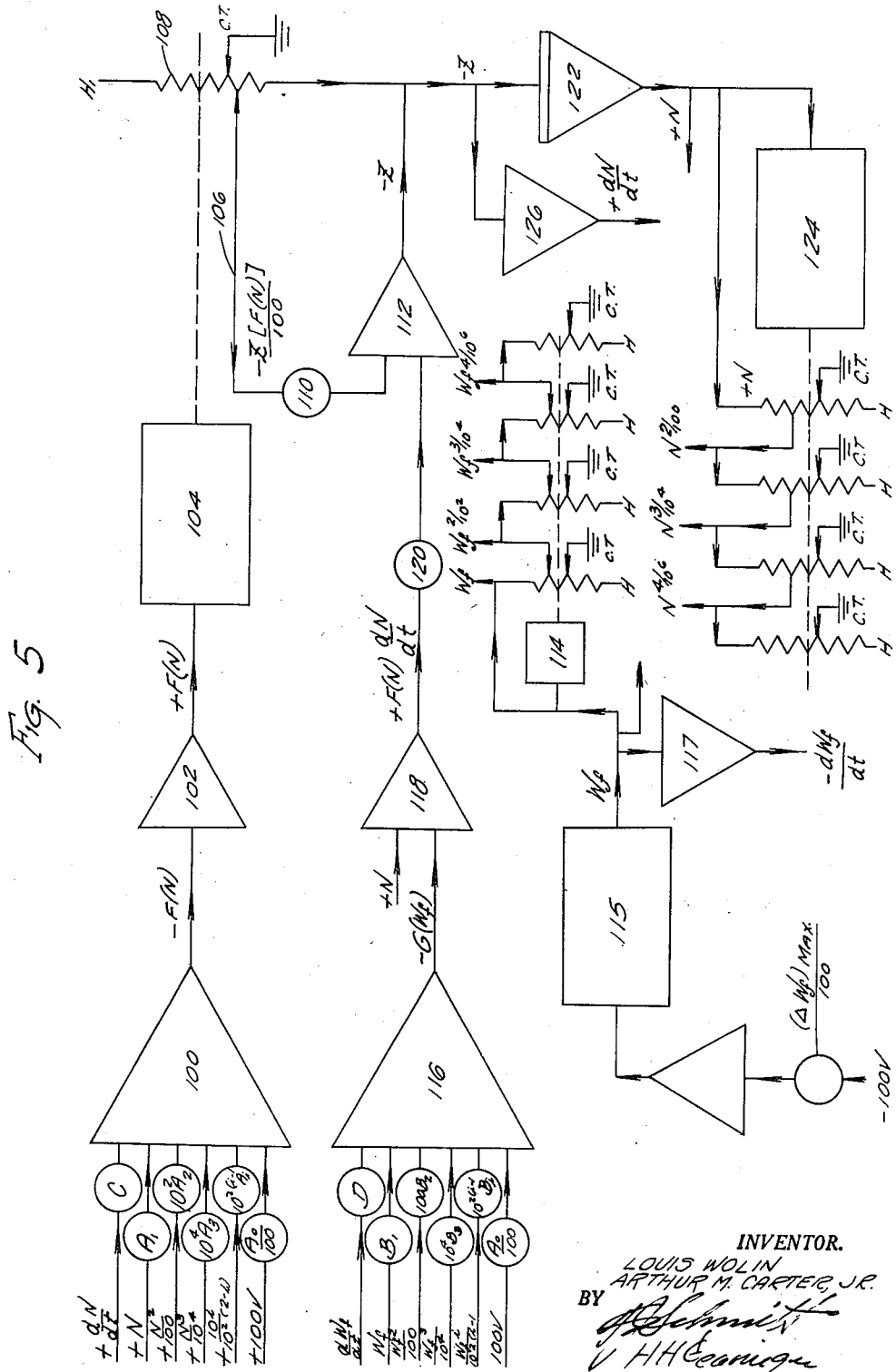

United States Patent Office 2,771,243
Patented Nov. 20, 1956

2,771,243
APPARATUS FOR SIMULATING AN ENGINE
Louis Wolin, Philadelphia, and Arthur M. Carter, Jr., Rosemont, Pa.

Application September 3, 1952, Serial No. 307,725

3 Claims. (Cl. 235—61)

(Granted under Title 35, U. S. Code (1952), sec. 266)

This invention relates to a method for simulating the dynamic characteristics of a moving system and it particularly relates to a method for simulating such characteristics over the complete operating regime of the system.

Although the invention can be used to simulate the dynamic characteristics of any number of different kinds of moving systems, it is shown here as applied to an engine such as a turbo-jet or turbo-prop engine.

The derivation of a correct representation of the engine requires the correlation of such variables as engine speed, fuel flow, engine pressures, temperatures, burner efficiency, etc., as well as ram and altitude considerations in the case of jet-engines. Fortunately, however, many variables can be determined uniquely from a consideration of the physics of the problem and a few independent and dependent variables.

Although it is obvious that the response of an engine is dependent upon the fuel flow input as a function of time, it is not always easy from theory to predict the effects on the response of variations in the input function. The principal reason for this difficulty is the inability to define accurately the non-linear configuration of the curve of performance, or differential equation, of the engine in its dynamic state. It is absolutely essential, however, to be able to predict these effects and to be able to define the characteristics of the engine or other physical system before any kind of controls, whether automatic or non-automatic, can be devised to give optimum performance.

Heretofore, it has been attempted to obtain a dynamic representation of a moving system such as an engine by the use of linear differential equations or by the use of an actual engine. These methods, however, were inadequate. Linear differential equations can be used only for changes about a steady state operating point over which the assumption of linearity is valid. The stability and general behavior of such systems may be studied by the application of the principles of the theory of small oscillations, but this method leads to linear differential equations with constant parameters. In most cases, it is difficult to get accurate differential equations of motion, due to the complexity of a system such as a jet engine, and to the variable effects of damping, friction, burner efficiency, etc. of the engine. Furthermore, the linear system requires a recalculation of the parameters for each operating condition of the engine, such as of the speed, ram, thrust, and altitude. There is, furthermore, no assurance that if a system is stable for small changes or perturbations, that it will be stable for large changes in these variables.

Insofar as regards the use of an actual operating system such as an engine for testing purposes, the necessity to actually build the engine, merely to study its characteristics, is an expensive, inefficient, and time consuming procedure which is to be avoided if at all possible. If such an engine is built, any change which must be made in the control element requires the overhaul of the control. For example, if the stiffness of a spring, the area of a piston, or a flow coefficient must be changed, the entire control may have to be altered. Furthermore, the engine is subject to undue wear and possible destruction. In addition, in regard to an airplane engine, it is difficult to obtain altitude data since most controls are checked under sea-level conditions.

It is, therefore, one object of this invention to provide a means for accurately simulating the dynamic characteristics of a moving system over its complete operating regime.

Another object of this invention is to provide a non-linear representation of a dynamic system.

Another object of this invention is to determine the dynamic control system requirements of an engine.

Another object of this invention is to provide a method for using an analog computer to obtain non-linear differential equations representing a dynamic system and its control means.

Another object of this invention is to determine the physical dimensions and characteristics required for each element of the control means for a dynamic system.

Another object of this invention is to determine the effect of change of altitude, temperature, pressure, etc. on the transient and steady-state performance of an engine when the parameters of the control system are held constant.

Other objects and many of the attendant advantages of this invention will be readily appreciated as the same becomes better understood by reference to the following detailed description when considered in connection with the accompanying drawings wherein:

Fig. 1 is a block diagram of one method of simulating a dynamic system such as an engine.

Fig. 5 is a diagrammatic representation of a computer apparatus for simulating a dynamic system such as an engine.

Referring now in greater detail to the essential elements of the invention, it has been determined that the dynamic characteristics of a turbo-jet engine can be represented by the following non-linear differential equation:

$$F(N)\frac{dN}{dt}+N=G(w_f) \qquad \text{Equation 1}$$

where $\frac{dN}{dt}=a=$ engine acceleration $N=$ instantaneous engine speed $w_f=$ instantaneous fuel flow $G(w_f)=$ engine speed as a function of fuel flow with acceleration equal to zero $F(N)=$ the damping coefficient, which is a function of the instantaneous engine speed Equation 1 is non-linear since the functions $F(N)$ and $G(w_f)$ are functions of engine speed and fuel flow, and the values of these functions depend upon the initial conditions chosen. The standard mathematical techniques which employ the principle of superposition cannot be used to solve this type of equation. However, computer techniques, both analogue and digital, make the solution of the problem a relatively simple operation.

Before the derived engine equation can be used for simulation, the parameters of the equation must be reduced to numerical values. The principal characteristic distinguishing this procedure is the concentration on the actual transient and steady-state data for any given engine. The determination of the engine equation from its response resolves itself to a problem of curve fitting.

It is first necessary to express $G(w_f)$ as a power series of $w_f$, i. e.:

$$G(w_f) = b_0 + b_1 w_f + b_2 w_f^2 + \ldots b_L w_f^L$$

Figure 2:
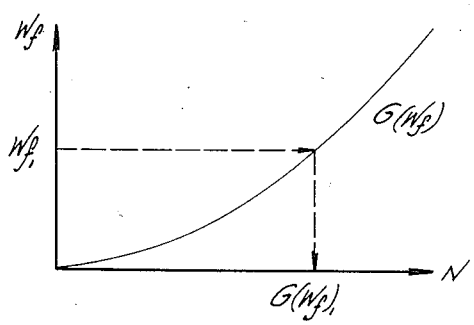
Fig. 2 is a plot showing a representative curve used to determine the engine speed as a function of fuel flow with zero acceleration.

To determine the coefficients $b_0, b_1 \ldots b_L$, a plot is made of engine speed N versus fuel flow $w_f$ during the steady-state operation of the engine. The necessary data is obtained experimentally or from design date. A representative plot is shown in Fig. 2.

By standard methods of curve fitting, the values of $b_0, b_1 \ldots b_L$ are determined. The least-square criterion can be used to ascertain the accuracy of the numerical values of $b_0, b_1 \ldots b_L$, such that the sum of the squares of the differences between the given experimental or design data curve and the derived curve is a minimum.

It is next necessary to express F(N) as a power series of N, i. e.:

$$F(N) = C_0 + C_1 N + C_2 N^2 + \ldots C_L N^L$$

To determine the coefficients $C_0, C_1 \ldots C_L$, a family of curves is drawn for fuel flow $w_f$ versus engine speed N, with engine acceleration "a" as a parameter. A representative plot is shown in Fig. 3.

Figure 3:
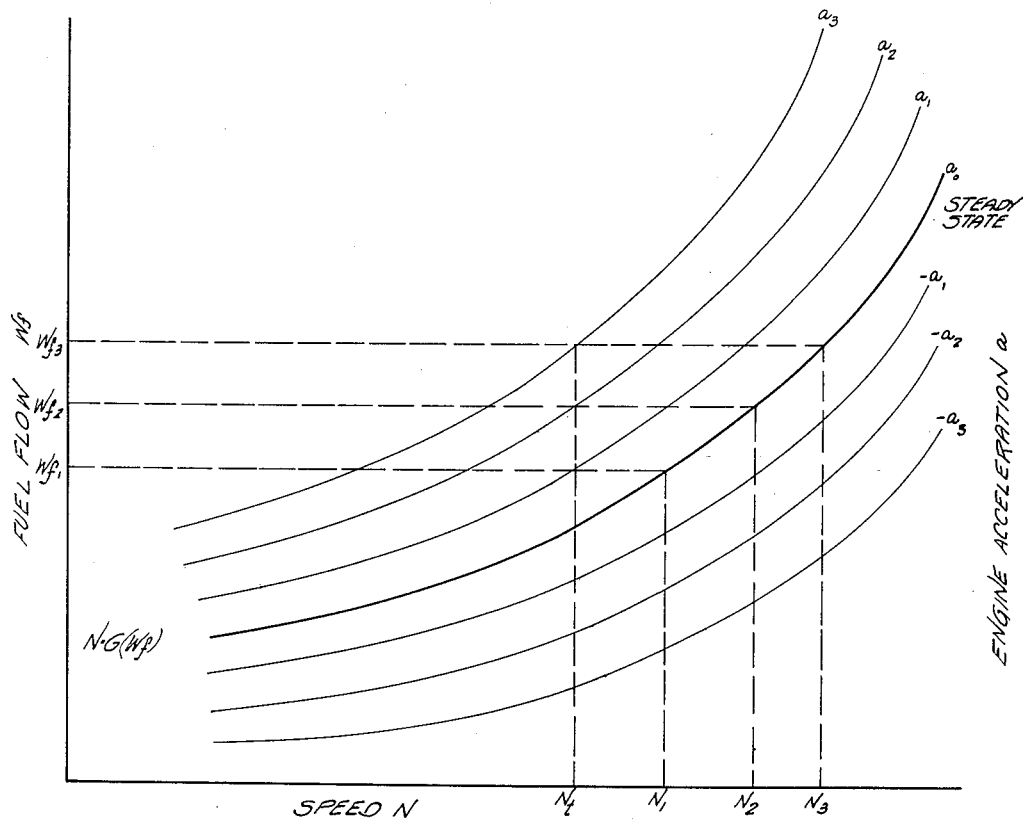
Fig. 3 is a plot to determine the speed of the engine as a function of fuel flow and acceleration.

From the plot shown in Fig. 3 it is seen that for any combination of "N" and "a" chosen, there is a corresponding value of $G(w_f)$ and instantaneous fuel flow $w_f$. Equation 1 is re-arranged as follows:

$$F(N) = \frac{[G(w_f) - N]}{a} \qquad \text{Equation 2}$$

The term $[G(w_f) - N]$ can be thought of as the "error" between the instantaneous, transient engine speed N and the steady-state engine speed that would result if the instantaneous fuel flow $w_f$ were held constant at the value determined by the "N" and "a" chosen.

Since for any combination of "N" and "a" chosen, the accompanying value of $G(w_f)$ can be determined, Equation 2 can be solved for the corresponding value of F(N).

Figure 4:
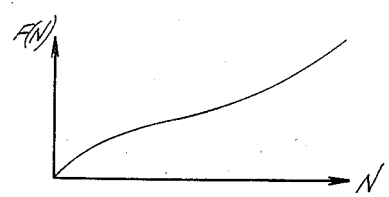
Fig. 4 is a plot of engine acceleration versus engine speed.

It has been determined that for any "N" chosen, the value of F(N) is constant for all values of acceleration "a." The values of F(N) for representative values of N are determinied, and a plot of F(N) versus N is made as illustrated in Fig. 4. The standard methods of curve fitting are applied to the above plot to determine the values of the coefficients $C_0, C_1 \ldots C_L$.

A dynamic engine simulator is then constructed using standard analogue computer components. One such simulator is shown in the block diagram of Fig. 1.

A measure of the instantaneous fuel flow $w_f$ in the form of a voltage is fed to a function generator 10 whose output is $G(w_f)$ which is the engine speed as a function of fuel flow with a zero acceleration. The function $G(w_f)$ is fed to an adder or summer 12. The adder, meanwhile, receives the term $-N$ from the system and adds this term to $G(w_f)$. Since $$G(w_f) - N = F(N)\frac{dN}{dt}$$

the output of the adder 12 is $$F(N)\frac{dN}{dt}$$

and this function is fed into a divider 14. At the same time the divider 14 receives from the system the function F(N) which is the engine acceleration expressed as a function of N. It then divides $$F(N)\frac{dN}{dt}$$

by F(N) to give an output of $$\frac{dN}{dt}$$

which is the acceleration. The acceleration $$\frac{dN}{dt}$$

is fed into an integrator 16 which gives an output N which is the instantaneous speed. The term N is fed both to the inverter 18 where it is inverted to $-N$ for feeding back into the adder 12 for the next cycle, and to the function generator which gives an output F(N) to be fed into the divider 14 for the next cycle which coincides with a new instantaneous fuel flow $w_f$ put into the function generator 10. The complete closed-loop simulation of the engine is now accomplished.

In Fig. 5 is shown the detailed construction of an analogue type computer system for simulating an engine wherein the same curve, as in Fig. 1, $$F(N)\frac{dN}{dt} + N = G(w_f)$$

is generated. In this figure the function generator 20 is broken down into its components including the servo mechanism 124, inverter 126 and the adder 100 and its multipliers. The components of the function generator 10 are disclosed as constituting a function generator 115, a servo mechanism 114, differentiator 117 and the adder 116 and its multipliers.

The specific details of the construction and operation of the computor in Fig. 5 is as follows:

The curve is generated by summing the function $$F(N) = \sum_{i=0}^{k} A_i N^i + C\frac{dN}{dt}$$

where $A_i$ is a power series constant and C is determined from the plot shown in Fig. 3 and by summing $$G(w_f) = \sum_{i=0}^{k} B_i w_f^i + D\frac{dw_f}{dt}$$

where $B_i$ is a power series constant and D is a coefficient representing the inherent physical characteristics of the engine.

The components of the summation for F(N) are put into the adder and inverter 100 such as shown on pages 8 and 9 of the brochure "RICO-2" of the Reeves Instrument Corporation. It is shown that $$\frac{dN}{dt}$$

is multiplied by C before being applied to adder 100, and that $N^i$ is multiplied by $A_i$. The terms $N^2, N^3$, etc. are divided by $10^2, 10^4, 10^6$, etc. because 100 volts happens to be the maximum voltage of the servo units which provide these terms and therefore the N term cannot be larger than 100. This is merely an aspect of the physical characteristics of the components of the system, however, and may be varied. To provide for the appearance of the terms $10^2, 10^3, 10^4$, etc. as dividers for the N terms, the constants $A_1, A_2, A_3$, etc. are multiplied by $10^2, 10^3, 10^4$, etc. The powers of 10 for the N terms and for the A terms then factor out.

The output of the summation at 100 is $-F(N)$. This output is sent through an invertor 102, as described on page 9 of the brochure referred to above, whose output is $+F(N)$. The output $+F(N)$ is fed to the servo mechanism 104 which acts to move a slide wire 106 along a potentiometer 108 a distance equal to a value $$Z = \frac{dN}{dt}$$

The result is an output from the potentiometer of $$\frac{-Z[F(N)]}{100}$$

the number 100 being the maximum voltage of the potentiometer. The term $$\frac{-Z[F(N)]}{100}$$

is multiplied by 10 at the multiplier 110 and the result $$\frac{-Z[F(N)]}{10}$$

is fed into the gain amplifier and adder 112.

The instantaneous fuel flow or input $w_f$ is, meanwhile, applied to a servo mechanism 114 by a function generator 115, and the servo mechanism sets up the values in voltages of $$w_f, \frac{w_f}{10^2}, \frac{w_f}{10^4}, \frac{w_f}{10^6}, \text{etc.}$$

The terms $10^2$, $10^4$, $10^6$, etc. being determined by the physical characteristics of the servo mechanism limiting its maximum voltage. The terms $$w_f, \frac{w_f}{10^2}, \text{etc.}$$

are then fed to the adder and inverter 116 to be used in the summation $$\sum_{i=0}^{k} B_i w_f + D \frac{dw_f}{dt}$$

A servo mechanism capable of setting of these voltage values is illustrated in such an operation on page 15 of the brochure referred to above. The function generator 115 also applies $w_f$ to a differentiator 117 the resultant, $$\frac{-dw_f}{dt}$$

of which is inverted and then applied to adder 116. It should be noted that here, too, the power constants, in this case being $B_1$, $B_2$, etc. are multiplied by an amount equal to the amount by which the $w_f$ terms are divided so that each factors the other out.

The output $-G(w_f)$ of adder 116 is fed to an adder 118. The instantaneous engine speed N is also fed to the adder and inverter 118 from the system. The output of the adder is $$F(N) \frac{dN}{dt}$$

This output is multiplied by 0.1 at 120 to give $$\frac{F(N) \frac{dN}{dt}}{10}$$

which is fed into the high gain amplifier and adder 112.

The amplifier 112 has a large amplification factor $\mu$ and what takes place in the amplifier is expressed by the following equation:

$$\left[ \frac{F(N) \frac{dN}{dt}}{10} + \frac{-Z[F(N)]}{10} \right] \mu = -Z$$

Solving this equation by dividing both sides by $\mu$ there is obtained $$\left[ \frac{1}{10} F(N) \frac{dN}{dt} - Z[F(N)] \right] = \frac{Z}{\mu}$$

Since $\mu$ is very large, $$\frac{-Z}{\mu}$$

tends to zero, and therefore:

$$F(N) \frac{dN}{dt} - Z[F(N)] \longrightarrow 0$$

or $$\frac{dN}{dt} - Z \longrightarrow 0$$

or $$Z \longrightarrow \frac{dN}{dt}$$

which might be approximately expressed as:

$$Z = \frac{dN}{dt}$$

The value $-Z$ is fed from the amplifier 112 to an integrator and inverter 122 which gives the value N. The output N is fed back into the adder 100. It is also fed into a servo mechanism 124 which generates the values $$\frac{N^2}{10^2}, \frac{N^2}{10^4}, \text{etc.}$$

which are, in turn, fed back into the adder 100.

The output $-Z$ is also fed into an inverter 126 which gives the output $$\frac{dN}{dt}$$

This output, too, is fed back to the adder 100.

The elements such as the multiplier 110, function generator 114, adder and invertor 116, multiplier 120 and integrator 122 are all commercially obtainable devices such as shown on pages 6 to 10 of the brochure "RICO-2" of the Reeves Instrument Corporation or in the brochure "For Solving Problems in Dynamics" of Electronic Associates Incorporated.

The variables used in this equation are not necessarily limited in scope to the first derivatives but may include any number of higher order derivatives of any degree to express various characteristics, if it is at any time determined that it is necessary to include such characteristics in the equation.

Obviously, many modifications and variations of the present invention are possible in the light of the above teachings. For example, although the invention has been described in relation to the use of one particular equation having certain variables, it is likely that other equations including more or other variables may be used. Furthermore, although the invention has been described in relation to an engine, it applies equally as well to the simulation of any dynamic system, mechanical, chemical, electrical or biological. It is, therefore, to be understood that within the scope of the appended claims, the invention may be practiced otherwise than as specifically described.

The invention described herein may be manufactured and used by or for the Government of the United States of America for governmental purposes without the payment of any royalties thereon or therefor.

What is claimed as the invention is:

1. A computer device for simulating a dynamic system comprising an electrical system wherein there is provided a function generator for converting an input voltage proportional to a value of a first variable into an output voltage proportional to a mathematical function of the value of said first variable, summation means for receiving said output voltage and adding thereto a voltage proportional to a first value of a second variable to obtain a second output voltage, a divider for receiving said second output voltage and dividing it by a voltage proportional to a mathematical function of the first value of said second variable, said last mentioned voltage being obtained from a second function generator, integrating means for receiving the output voltage of said divider, said last mentioned output voltage being proportional to a value of a third variable in the form of a mathematical differential, and converting said last mentioned output voltage into a voltage proportional to said first value of said second variable, means for feeding said last mentioned voltage both to said summation means and to said second function generator said second function generator being adapted to convert said voltage into a voltage proportional to a mathematical function of said first value to be fed to said divider, whereby a closed loop simulation of said dynamic system is obtained.

2. A computer device for simulating the dynamic characteristics of an engine wherein said characteristics include a variable representing the rate of fuel flow, a variable representing the engine acceleration and a variable representing the engine speed, said device comprising an electrical network including means for supplying a voltage proportional to the instantaneous fuel flow at the activation of the engine when the engine acceleration is equal to zero, means for converting said voltage to a voltage proportional to the representation of the engine speed as a mathematical function of said fuel flow, means for supplying a voltage proportional to the engine speed at any given instant, means for summing said last two mentioned voltages to produce an additive voltage, means for supplying a voltage proportional to the damping coefficient which is a mathematical function of the engine speed at any given instant, means to divide said additive voltage by the voltage proportional to the damping coefficient to produce a quotient voltage, means to mathematically integrate said quotient voltage to produce a voltage proportional to the engine speed at another given instant, and means to feed said last mentioned voltage both to said first mentioned means for supplying a voltage proportional to the engine speed at any given instant and to said means for supplying a voltage proportional to said damping coefficient.

3. A computer device for simulating a dynamic system represented by a non-linear differential equation and having variables representing the various dynamic characteristics of said system, said device comprising an electrical network wherein there are included means for translating at least two of said variables into individual power series, means for summing the values of the first power series, means for summing the values of the second power series, means for adding the sum of the second power series and the first of the said two variables, means for dividing the last mentioned sum by the sum of the first power series to provide the value of a third variable, means responsive to the value of the third variable for controlling one of the said power series, said one of said individual power series having a new value of said first variable and means for returning the new value of the first variable to the means adding the sum of the second power series and the first of the said two variables for use in a new cycle of operation of said network, whereby a closed loop simulation of said dynamic system is effected.

References Cited in the file of this patent

UNITED STATES PATENTS

| | | |
|---|---|---|
| 2,471,315 | Dehmel | May 24, 1949 |
| 2,581,438 | Palmer | Jan. 8, 1952 |
| 2,634,909 | Lehman | Apr. 14, 1953 |
| 2,671,610 | Sweer | Mar. 9, 1954 |

OTHER REFERENCES

A. I. E. E. Technical Paper 49–165, "Application of the Cal Tech Electric Analog Computer to Nonlinear Mechanics and Servo-mechanisms," June 20 to 24, 1949.

"Electronic Analogue Computers," by David Fidelman, "Radio News" Engineer Edition, December 1948, pages 3 to 6, 29 and 30.

The Electro-Analogue, an Apparatus for Studying Regulating Systems, by J. Janssen et al., Philips Technical Review, vol. 12, No. 11, pages 319 to 335, May 1951.